Jan. 14, 1958 F. A. GREENAWALT 2,820,121
CONTROL APPARATUS
Filed March 21, 1956 2 Sheets-Sheet 1

INVENTOR.
FREDERICK A. GREENAWALT
BY Roy E. Raney
ATTORNEY

Jan. 14, 1958　　F. A. GREENAWALT　　2,820,121
CONTROL APPARATUS
Filed March 21, 1956　　2 Sheets-Sheet 2
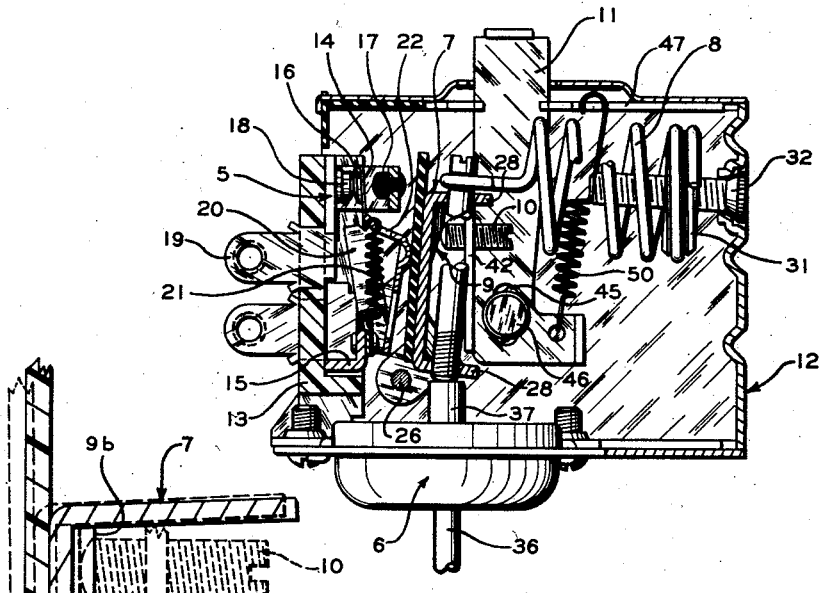
FIG. 2
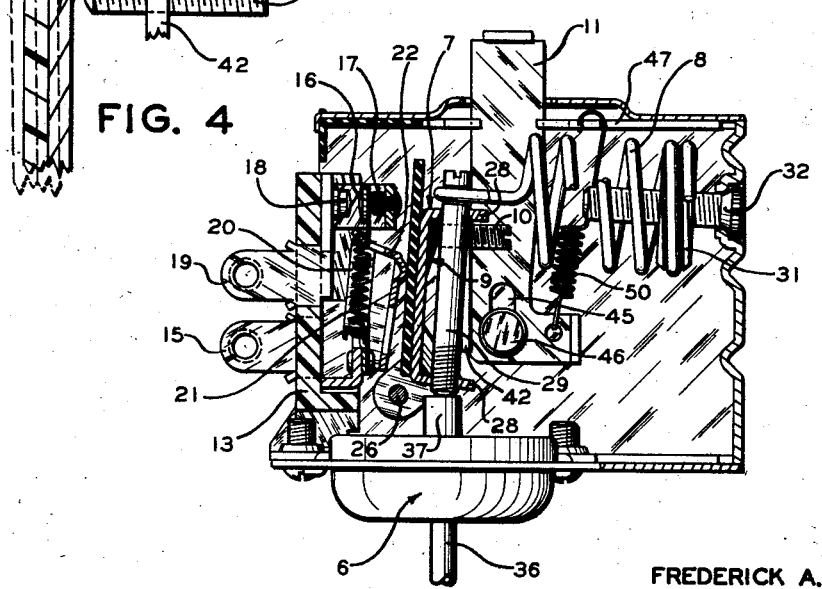
FIG. 4
FIG. 3
INVENTOR.
FREDERICK A. GREENAWALT
BY
ATTORNEY United States Patent Office 2,820,121
Patented Jan. 14, 1958

2,820,121

CONTROL APPARATUS

Frederick A. Greenawalt, Columbus, Ohio, assignor to Ranco Incorporated, Columbus, Ohio, a corporation of Ohio Application March 21, 1956, Serial No. 572,935

7 Claims. (Cl. 200—140)

The present invention relates to an improved control apparatus for shutting down cyclically functioning machinery upon the occurrence of an abnormal condition to prevent damage to or malfunctioning of the machinery. The invention is particularly useful in control apparatus which shuts down refrigerating equipment upon the occurrence of an abnormal refrigerant pressure.

Control apparatus of the general character mentioned is old in the refrigeration art, but heretofore the pressure-sensing element and the parts actuated thereby moved according to the normal cycling pressures and this movement resulted in wear and oftentimes in shifting of adjustments which would be apt to cause failure or inaccuracy of operation of the apparatus as intended. The aim of the present invention is to provide an improved control apparatus of the character referred to in which no movement of the condition-sensing element or the parts actuated thereby takes place during normal variations in the conditions to be controlled, aside from initial movement occasioned by variation of the condition toward the critical limit at which the control apparatus is set to operate.

The invention comprises a control device movable from one control position to another by an element which has a part inherently movable in opposite directions according to changes in a condition toward and from a predetermined limit, means being provided to prevent movement of the part in the direction corresponding to a change from the limit whereby fluctuations in the condition short of the point at which the element operates the control device may occur without corresponding movement of the part. For example, the invention may be utilized in a control for an electric motor driven refrigerating system to open the motor circuit in the event an excessively high pressure is built up in the system, such control comprising a diaphragm or bellows subjected to the refrigerant pressure in the system and a normally closed electric switch arranged to be opened by the bellows when the refrigerant pressure is increased above its normal range to a predetermined limit determined by a loading on the bellows, means being provided to prevent movement of the bellows and the parts connecting it with the switch, in response to decrease in pressures whereby the bellows and the parts moved thereby remain motionless during cycling of the refrigerating system at normal pressures and move only upon increases in pressure above a preceding maximum. The means to prevent movement of the bellows and its associated parts as described, is preferably constructed so that the parts may be released following opening of the switch to thereby restore the device for normal operation of the refrigerating system following correction of the cause of the high pressure therein.

A more specific object of the invention is the provision of a control apparatus comprising a control device actuated by an oscillatable condition-responsive member, the member being blocked from movement in one direction by a cam and cam follower, the cam having a rise and spring means acting to cause the follower to have relative movement along the rise according to the extent of movement of the condition responsive member in one direction and thereby serve as a wedge to prevent reverse movement of the condition responsive member.

Other objects and advantages of the invention will be apparent from the following description of a preferred form of the invention, reference being had to the accompanying drawings wherein Fig. 1 shows a control apparatus in section connected in a refrigeration system, shown schematically, for shutting down the system in the event of an excessive refrigerant pressure in the system;

Figs. 2 and 3 are sectional views of the control apparatus showing certain parts thereof in different positions, and Fig. 4 is a fragmentary view showing certain parts of the control apparatus on a larger scale.

Sketch of preferred embodiment

In the preferred form of the invention a normally closed electric switch 5 is arranged to be opened by a bellows 6, subjected to the pressure of the refrigerant in the high side of the refrigerating system to be controlled, when the pressure reaches a predetermined maximum. Bellows movement is transmitted to the switch through a lever 7 and an adjustable spring 8 opposes the bellows expansion to regulate the pressure at which the switch is opened, all of which construction is well known in the art.

The lever may freely move according to expansion of the bellows but its movement according to decreases in pressure in the bellows is blocked by the co-action of a cam 9 on the lever and a stop screw 10 carried on an upwardly biased slide bar 11 which is restrained from upward movement by the screw abutting the cam surface. As the lever moves toward the switch opening position (counter-clockwise as viewed in the drawings) the slide bar moves upwardly according to the travel required to maintain the screw in contact with the cam so that the screw blocks all clockwise movement of the lever. A more detailed explanation of the present embodiment of the invention follows.

Detailed description

Figure 1:
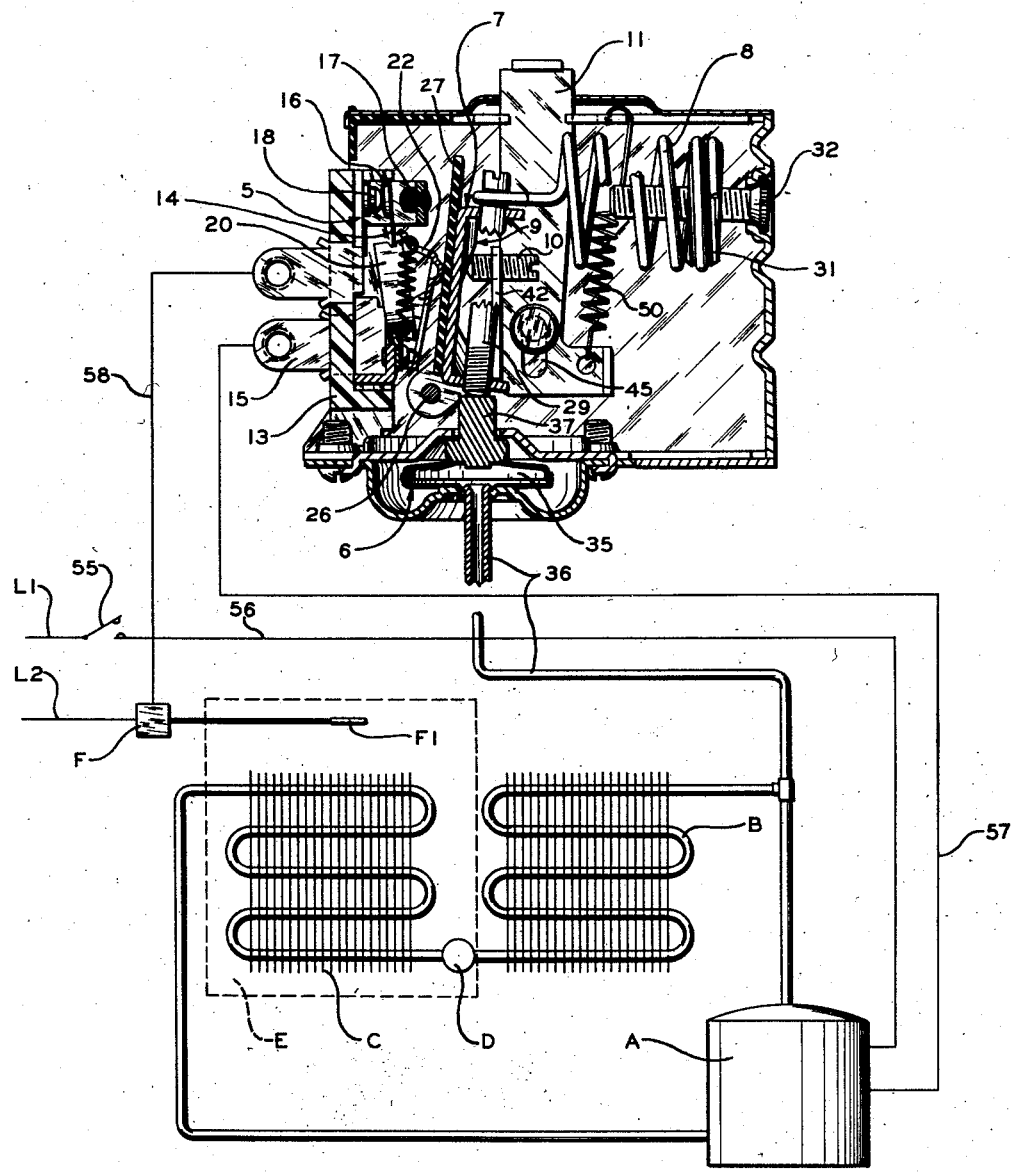

The control apparatus comprises a suitable housing 12 in which the switch 5 is enclosed. The switch 5 is a conventional snap acting construction and is carried by a dielectric base 13 attached in an opening in a wall of the housing. In the form shown the switch includes a leaf spring contact 14 attached at one end to terminal post member 15 and the opposite end, carrying a contact 16, moves between an electrically insulated stop 17 and a contact 18 fixed to a second terminal member 19 embedded in the base 13. The free portion of contact spring 14 is snap moved from one position to the other by a toggle member 20 having one end pivoted thereon and the opposite end movable between limited positions as determined by spaced tongues thereon moving between a fixed lug, as shown, the toggle member being biased longitudinally toward its pivot by a tension spring 21 having one end pivotally connected to the toggle member and the other attached to an actuating lever 22 which is arranged to swing the spring and move the centerline of force thereof from one side to the other of its dead center relative to the toggle member and thereby snap the latter between its limits and cause snap movement of the contact spring. The pivot for actuating lever 22 is arranged relative to the line of tension of spring 21 to be urged clockwise about its pivot, as viewed in the drawings, and is thereby normally biased in position to cause contact 16 to close on contact 18.

Actuating lever 22 is moved counterclockwise to open the switch by lever 7 which is in the form of a bellcrank comprising a metal stamping, pivoted on a pin 26 journaled in the housing walls, and an electrical insulator 27 attached to one side to electrically insulate the stamping from switch actuator 22. Lever 7 has opposed spaced lugs 28 with openings therethrough through which a pin 29 projects which pin is threaded in the lower opening, as may be seen in the drawings. The upper end of the pin is grooved and spring 8 has one end engaged in the groove and the opposite end attached to a disc 31 threaded on a screw 32 rotatably supported in an opening in housing 12. The tension of spring 8 urges lever 7 clockwise and by rotating screw 32 to shift plate 31 therealong the length and consequently the tension of the spring can be adjusted to load bellows 6 and cause the switch to be opened at a pre-determined pressure, as is explained more fully hereinafter.

Lever 7 is moved counterclockwise by bellows 6, which is a conventional pressure responsive construction comprising two flexible disc-shape members brazed together to form a hollow expansible chamber 35 and a tube 36 is connected with the chamber for placing the bellows in communication with the interior of the refrigerating system to be controlled, as shown in Fig. 1. The bellows is housed in a cup-shape member attached to the housing wall. A post 37 is attached to the center of the upper wall of the bellows and engages the lower end of pin 29 so that expansion of the bellows moves lever 7 counterclockwise in the switch opening direction. The construction of the bellows is such that a pressure therein of less than the minimum normal pressures in the refrigerating system will maintain post 37 in engagement with pin 29. For example, if the normal pressure range in the refrigerating system is from 100 to 250 lbs./sq. in., 75 lbs./sq. in. pressure will maintain the bellows expanded so that post 37 engages pin 29 of lever 7 at all times. If it is desired to have the switch open at 300 lbs./sq. in. pressure, for example, the tension of spring 8 is adjusted to load the bellows to require 300 lbs./sq. in. pressure to expand the bellows sufficiently to swing lever 7 to a position to open the switch. It will be apparent that as pressure in the bellows approaches 300 lbs./sq. in., lever 7 will be moved counterclockwise and the tension of spring 8 increases as this movement of the lever stretches the spring. It will be seen that during variations in pressures below 300 lbs./sq. in., according to the control apparatus as thus far described, which is in principle similar to prior art construction, the bellows, switch operating lever 7 and tension spring 8 would move correspondingly to increases and decreases in pressure of the refrigerant in the system.

According to the present invention, however, lever 7 is prevented from moving clockwise following counterclockwise movement thereof by expansion of the bellows, and this is accomplished by the provision of cam 9 formed on lever 7, and cam follower screw 10 threaded through an opening in a flange 42 formed on the slide or reset bar 11. Bar 11 is a sheet metal stamping having a longitudinally extending slot 45 in the lower end through which a fixed, headed guide pin 46 extends, the guide pin being firmly attached to a side wall of the housing. The upper portion of bar 11 is slidingly guided in a partially open sided slot formed in an inturned tab 47 on the housing. It will be seen that the bar 11 may move vertically but not laterally so that screw 10 blocks clockwise movement of the lever 7 when in engagement with the cam 9. A tension spring 50, having one end anchored to the housing and the other end hooked in an opening through a foot on the bar 11, urges the bar upwardly, as viewed in the drawing, so that when the lever 7 moves counterclockwise the cam surface tends to leave the follower screw 10 thereby releasing the bar so that the latter moves upwardly and maintains contact between the screw and cam to thereby prevent clockwise movement of the lever upon subsequent reduction of pressure in the bellows. It will be seen that the cam 9 and follower screw 10 act similarly to a wedge inserted along lever 7 as the latter moves in a counterclockwise direction to block clockwise movement of the lever. The slope of the cam surface is such that the clockwise force on lever 7 is incapable of driving the bar 11 downwardly, as viewed in the drawings. The portion 9a of the cam 9, as best seen in Fig. 4, is inclined relative to the direction of movement of the bar 11 and the portion 9b is substantially parallel thereto so that when the lever 7 moves counterclockwise sufficiently to open the switch, the follower screw 10 leaves the surface 9a and thereby permits spring 50 to move the bar outwardly to the limit permitted by the slot and pin, as seen in Fig. 3.

By pressing the bar 11 inwardly, the cam follower screw is moved to a position opposite the lower end portion of cam surface 9a so that the lever 7 can be returned by the tension of the range spring to the switch closing position, as seen in Fig. 1.

The control apparatus is employed in a refrigerating system as illustrated in Fig. 1 wherein an electric motor driven compressor A has its discharge connected to a condenser B which in turn is in communication with an evaporator C through a suitable expansion regulator D, and the evaporator is connected with the compressor intake in the usual manner. The evaporator is enclosed in a suitable chamber E to be cooled. The circuit for the compressor A includes power line L1, manual "on-off" switch 55, wire 56, to one side of the compressor motor, wire 57 from the other side of the motor to terminal 15 of the control apparatus, contact spring 14, contacts 16, 18 to terminal 19, wire 58 to one terminal of a thermostatically operated switch F, the other terminal of which is connected to L2 of the power supply.

The thermostatic switch F may be of any suitable construction, many of which are well known in the art, and it comprises a switch operated by a gas filled bellows having a bulb F1 sensitive to temperatures in the cooling chamber and arranged to close the switch when the temperature reaches a pre-determined high and to open the switch when the temperature is reduced to a pre-determined low. As is well understood in the art, the refrigerant pressure in the evaporator corresponds to the temperature of the evaporator which rises and falls in cycles according to operation of the thermostatic switch F. Typical pressures will range from 150 to 200 lbs./sq. in. The tube 36 of the bellows 6 is connected in the discharge pipe of the refrigerating system as shown so that the pressure inside the bellows is the same as that in the high side of the system.

It will be seen that during normal operation of the refrigerating system, the thermostatic control switch F regulates the operation of the refrigerator motor according to the temperature in the cooling chamber E and the pressure of the refrigerant in the high side of the system will rise and fall between normal values. During the rise of pressure to any initial maximum value which is sufficient to move lever 7 against the load of spring 8, the bellows moves the lever 7 toward switch opening position and upon a decrease in pressure the follower screw 10 prevents return movement of the lever by the wedging action described hereinbefore. As explained previously, the pressure required to maintain the bellows expanded against the lever 7 is considerably less than the minimum normal head pressures, and therefore the bellows maintains the position of the maximum normal head pressure. Thus, there is no movement of the bellows, lever 7 and spring 8 during normal fluctuations in head pressures other than initial movement of the parts according to the highest head pressure encountered without reaching that required to open the switch, and therefore wear and fatigue of the bellows, range spring and pivots is avoided.

It will be understood that while the preferred form of the invention shown is operative to open the switch in response to a maximum pressure, the same principle can be employed to open the switch in response to a minimum pressure if desired. Minimum pressure or "low pressure cut-out" switches are well known in the art. In either case, the normal fluctuations in pressure do not produce any movement of the control apparatus parts.

Other forms, modifications and adaptations of the invention can be employed, all falling within the scope of the claims which follow.

I claim:
1. In a control apparatus comprising a control device operable between two control positions, conditions-responsive means movable in opposite directions within a given range of movement corresponding to given changes in a condition and operative to actuate said device from one control position to the other when moved to one extremity of said range of movement, and blocking means to automatically prevent movement of said condition-responsive means in the direction opposite to said one direction throughout said range of movement.

2. Control apparatus defined in claim 1 characterized by said blocking means comprising a cam and a cam follower one of which moves according to movement of said condition-responsive means and the other of which moves to maintain engagement therebetween to provide a wedging action and thereby automatically prevent movement of said condition-responsive means in the direction opposite said one direction throughout said range of movement following movement thereof in said one direction.

3. In a control apparatus comprising a control device and a pressure-responsive element for actuating said device from one control position to another, the combination of means operatively inter-connecting said element and device comprising an oscillatable member movable by said element in one direction in response to an increase in pressure within a given range of pressures, means biasing said member in the opposite direction, and means operable automatically to prevent movement of said member in one of said directions in response to changes in pressure within said range of pressures.

4. In a control apparatus comprising a control device and a pressure-responsive element for actuating said device from one control position to another, the combination of means operatively inter-connecting said element and device comprising an oscillatable member movable by said element in one direction in response to an increase in pressure, means biasing said member in the opposite direction, a cam surface on said member, a cam follower for engaging said surface and guided for movement in a direction transversely of the direction of movement of said cam as said member moves in one direction to follow the surface of said cam and provide a stop to block movement of said member in the direction opposite to said one direction, and means to bias said follower in a direction to cause said follower to engage said cam during movement of said member in said one direction.

5. In apparatus comprising a control device operable between two control positions, pressure sensitive means movable in opposite directions upon increases and decreases in pressures respectively and operative upon an increase in pressure to a predetermined value to actuate said device from one control position to the other, and blocking means automatically operable to prevent movement of said pressure responsive means in response to decreases in pressures below said predetermined value.

6. In apparatus comprising a control device operable between two control positions, pressure sensitive means movable in opposite directions upon increases and decreases in pressure respectively and operative upon an increase in pressure to a predetermined value to actuate said device from one control position to the other, blocking means automatically operable to prevent movement of said pressure responsive means in response to decreases in pressure below said predetermined value, and means to render said blocking means inoperable to permit return of said pressure sensitive means to positions corresponding to pressures below said predetermined value.

7. Control apparatus defined in claim 1 characterized by means to render said blocking means inoperative to permit movement of said condition responsive means in said opposite direction and from said one extremity of said range of movement.

References Cited in the file of this patent

UNITED STATES PATENTS

| | | |
|---|---|---|
| 1,985,100 | Kuhn et al. | Dec. 18, 1934 |
| 1,987,662 | Bletz | Jan. 15, 1935 |
| 2,671,838 | Senn | Mar. 9, 1954 |
| 2,692,922 | Millsap | Oct. 26, 1954 |